United States Patent [19]
Brooks

[11] Patent Number: 6,120,326
[45] Date of Patent: Sep. 19, 2000

[54] PLANAR-TUBULAR COMPOSITE CAPACITOR ARRAY AND ELECTRICAL CONNECTOR

[75] Inventor: John Brooks, Trenton, Canada

[73] Assignee: Amphenol Corporation, Wallingford, Conn.

[21] Appl. No.: 09/422,272

[22] Filed: Oct. 21, 1999

[51] Int. Cl.⁷ .................................................. H01R 13/66
[52] U.S. Cl. ........................................... 439/620; 333/182
[58] Field of Search ............................ 439/620; 333/182, 333/183, 185

[56] References Cited

U.S. PATENT DOCUMENTS

| | | |
|---|---|---|
| 3,890,546 | 6/1975 | Coleman . |
| 4,083,022 | 4/1978 | Nijman . |
| 4,247,881 | 1/1981 | Coleman . |
| 4,680,671 | 7/1987 | Brion et al. . |
| 4,707,048 | 11/1987 | Gliha et al. . |
| 4,707,049 | 11/1987 | Gliha . |
| 4,741,710 | 5/1988 | Hogan et al. . |
| 4,747,789 | 5/1988 | Gliha . |
| 4,768,977 | 9/1988 | Gliha, Jr. et al. . |
| 4,952,896 | 8/1990 | Dawson, Jr. . |
| 5,021,920 | 6/1991 | Smith . |
| 5,113,310 | 5/1992 | Kuroki et al. . |
| 5,153,540 | 10/1992 | Gliha, Jr. . |
| 5,287,076 | 2/1994 | Johnescu et al. .................. 333/182 |
| 5,448,445 | 9/1995 | Yamate et al. . |
| 5,543,755 | 8/1996 | Kumeji et al. ..................... 333/185 |
| 5,619,393 | 4/1997 | Summerfelt et al. . |
| 5,692,280 | 12/1997 | Taniguchi et al. . |
| 5,726,612 | 3/1998 | Mandai et al. . |
| 5,737,179 | 4/1998 | Shaw et al. . |
| 5,856,770 | 1/1999 | Mantese et al. .................. 333/182 |

OTHER PUBLICATIONS

"Amphenol Filtered Connectors/Filtered ARINC Connectors/Filtered MIL–C–24308 Connectors," Amphenol Canada Corporation (an ISO 9001 Company), 20 Melford Drive, Scarborough, Ontario Canada M1B 2X6.

Primary Examiner—Gary F. Paumen
Assistant Examiner—Phuongchi Nguyen
Attorney, Agent, or Firm—Blank Rome Comisky & McCauley, LLP

[57] ABSTRACT

A monolithic planar filter capacitor assembly includes a dielectric substrate, a plurality of through-holes, sets of interleaved ground and active electrodes and, within at least some of the through-holes, discrete capacitor structures electrically connected to one of the sets of interleaved electrodes.

18 Claims, 2 Drawing Sheets

| PLANAR PROTOTYPE CAPACITANCE pF | | | |
|---|---|---|---|
| 1 | 1612 | 18 | 39.12 |
| 2 | 40.36 | 19 | 7.47 |
| 3 | 41.14 | 20 | 1168 |
| 4 | 1630 | 21 | 1461 |
| 5 | 39.53 | 22 | 1502 |
| 6 | 40.04 | 23 | 40.61 |
| 7 | 1558 | 24 | 40.36 |
| 8 | 40.88 | 25 | 8.83 |
| 9 | 39.21 | 26 | 8.4 |
| 10 | 40.75 | 27 | 38.39 |
| 11 | 1566 | 28 | 31.36 |
| 12 | 1540 | 29 | 1465 |
| 13 | 1471 | 30 | 1517 |
| 14 | 1248 | 31 | 1517 |
| 15 | 1564 | 32 | 37.66 |
| 16 | 42.1 | 33 | 1520 |
| 17 | 15.91 | 34 | 1523 |

PLANAR-TUBULAR COMPOSITE CAPACITOR ARRAY AND ELECTRICAL CONNECTOR

BACKGROUND OF THE INVENTION

1. Field of the Invention

This invention relates to a planar monolithic filter array suitable for use in an electrical connector, and to an electrical connector utilizing such an array.

2. Description of Related Art

It is known to provide electrical filters in electrical connectors for the purpose of protecting sensitive electrical components from transient currents and voltages which develop in a transmission cable due to electromagnetic and radio frequency interference. Such transients are generally high frequency waveforms, and therefore capacitive or tuned pi circuits may be used to shunt the transients to ground without affecting the primary signal carried by the cable.

Conventional electrical connector capacitive filter designs generally fall into one of two categories: monolithic planar capacitors, and tubular capacitor arrangements. Monolithic planar capacitors are more convenient to install in an electrical connector, but lack the flexibility of tubular capacitor arrangements because it is difficult to vary capacitances between pins, while electrical connectors utilizing tubular capacitor arrangements tend to be more costly and difficult to assemble than those utilizing conventional monolithic planar capacitors even thought they offer the advantage of customized capacitances for different pins.

As illustrated in FIGS. 1 and 2, monolithic planar capacitors consist of a generally planar block 201 of dielectric material that includes interleaved ground electrodes 202 and live electrodes 203. Live electrodes 203 are arranged to be electrically connected to contact pins 204 (only one of which is shown) inserted through holes 205 in the block of dielectric material. The dielectric material is typically a ceramic material such as barium titanate. Holes 205 are conductively plated or include some type of conductive sleeve to form terminals 206, and either the contact pins 204 or the terminals 206 may be arranged to include or form a resilient structure 207 for maintaining an electrical connection between the contact pins and the terminals when one of the contact pins is inserted in the corresponding one of holes 205. The ground electrodes 202 extend to the perimeter of the array and are joined to a termination strip or coating 208 which may be electrically connected to ground via the shell 209 of a connector and/or via connecting structures such as plate springs 210.

As noted above, a problem with the monolithic capacitor structure of the prior art is that the range of capacitances that can be provided is relatively limited. The capacitance values achieved by this type of planar array capacitor are determined by the area of overlap of the active and ground electrodes, the thickness of the dielectric material between the electrodes and the dielectric constant of the material, but in practice the main limiting factor in determining the range of capacitances possible within the array is the dielectric constant of the ceramic or other dielectric material. By simply changing the overlap area of the electrodes or the dielectric thickness, a ratio of maximum to minimum capacitances of about 10:1 is all that can be achieved. While it is possible to form the dielectric material by co-firing different ceramic materials within one array to extend the range of capacitances, the associated processing problems make this an impractical solution.

In addition to the problem of limited range, the monolithic capacitor structure has the disadvantages that (i) the entire filter unit must be replaced as a unit even if only one of the capacitors is defective or needs to changed, (ii) in order to form pi filters, the inductors must be in tubular form and surrounded by the capacitors, which can create problems because of the different thermal expansion and other characteristics of the ceramic dielectric material of the filter block and the typically ferrite material of the inductors, and (iii) it is virtually impossible to eliminate cross-talk between the contacts through the common capacitances.

The second category of prior art capacitive filter designs involves utilizing discrete cylindrical or tubular capacitors which are formed as filter sleeves to be fitted around the contact pins and grounded to the connector shell through a conductive metal or metallized ground plate. These designs are disadvantageous in that the filter sleeves are fragile and require relatively complicated grounding and support arrangements, the use of capacitive filter sleeves leaves less room for the addition of inductive filter sleeves, although relative complicated combined inductive and capacitive filter sleeves are known.

In order to eliminate the disadvantages of conventional monolithic block capacitors and discrete cylindrical capacitive filter designs, it was proposed in U.S. Pat. No. 5,153,540 to provide an alternative monolithic filter capacitor design in which the dielectric substrate and interleaved electrodes are replaced by a monolithic supporting structure arranged to accommodate individual discoidal capacitors for each contact to be filtered. The supporting structure is in the form of a single high strength metal oxide substrate having a plurality of counter bores on each side and a connecting bore between the respective counter bores for accommodating low cost discoidal capacitors and ferrite inductors, as necessary, thereby providing a more robust monolithic capacitor array that has the advantage of being as easily assembled to a filter capacitor as the prior monolithic capacitor arrays, while permitting both capacitance values and filter types to be easily mixed within the array.

While the capacitor array disclosed in U.S. Pat. No. 5,153,540 is advantageous for many applications because it combines the strength and case of assembly of a monolithic capacitor array with the versatility of individual discoidal capacitors for each contact pin, a number of further improvements could still be made. First, in the capacitor array of U.S. Pat. No. 5,153,540, each contact to be filtered must be provided with an individual discoidal capacitor even though most contacts in a typical connector can use identical capacitances. Second, the relatively small discoidal capacitors required in a high density connector also have a limited range of capacitances, albeit greater than the range possible with the conventional monolithic capacitor designs. Third, bonding of the discoidal capacitors to the metal oxide support plate can create stresses in the capacitors due to the different thermal characteristics of the support structure and the discrete capacitors.

Therefore, a need still exists for an electrical connector filter assembly that provides a range of capacitances greater than is possible with either the conventional monolithic or discrete capacitive filter designs, and yet combines the ease-of-assembly of a conventional monolithic filter with the versatility of a discrete capacitors, with the added advantage of providing discrete capacitors or filters for only those of the contacts requiring filtering, and of enabling the materials of the support structure to be more closely matched to those of the discrete filter elements.

The claimed invention provides such a filter assembly by arranging the conventional capacitive filter structure to accommodate discrete capacitors. Those skilled in the art will recognize that it has previously been proposed to combine monolithic capacitor structures with filter elements such as inductors and/or diodes, as disclosed for example in U.S. Pat. Nos. 4,083,022 and 4,707,048, but none of the previous proposals have included the suggestion that the conventional monolithic capacitor structures be combined with additional discrete capacitors or capacitive filters rather than inductive or semiconductor type components to achieve the advantages noted above.

SUMMARY OF THE INVENTION

It is accordingly a first objective of the invention to overcome the disadvantages of conventional filter connector designs by providing an electrical connector filter assembly that provides a range of capacitances greater than is possible with either the conventional monolithic or discrete capacitive filter designs, that combines the ease-of-assembly of a conventional monolithic filter with the versatility of a discrete capacitors, and that has the added advantage of providing discrete capacitors or filters for only those contacts requiring filtering.

It is a second objective of the invention to provide a filter array for a multiple contact electrical connector, in which the capacitances associated with individual contacts may be varied by significantly higher ratios than can be achieved with conventional arrays.

It is a third objective of the invention to provide a filter array for a multiple contact electrical connector in which, as with a conventional discoidal or tubular capacitor arrangement, any desired combinations of capacitances can be provided for the contacts, without the need for a separate discrete capacitor for contacts having a common capacitance.

It is a fourth objective of the invention to provide a filter array for a multiple contact electrical connector in which capacitances of individual contacts can be varied without having to replace the entire filter array.

It is a fifth objective of the invention to provide a filtered multiple contact electrical connector having a greater range of capacitances than can be provided using conventional monolithic or discrete filter arrangements, and yet is simple to assemble, upgrade, or repair.

These objectives are achieved, in accordance with the principles of a preferred embodiment of the invention, by providing a planar capacitor array of the type made up of a block of ceramic dielectric material containing multiple electrodes separated by ceramic layers, the electrodes being connected to termination structures, but in which the range of capacitances is extended by providing enlarged contact openings in the array so that discrete discoidal or tubular capacitors or capacitive filter structures can be inserted between the monolithic filter capacitor termination structures and the contacts, thus combining the conventional monolithic capacitor with conventional discoidal or tubular capacitors to obtain a monolithic capacitor structure having a greater range of capacitances than is possible with either of the two types of conventional capacitive filter structures.

More particularly, the monolithic capacitive filter assembly of the preferred embodiment of the invention includes a monolithic substrate made of a dielectric material having embedded therein a plurality of interleaved ground and live electrodes, the live electrodes being connected to termination structures provided in multiple openings in the substrate, selected openings being made larger than in the conventional substrate in order to accommodate insertion of discrete capacitors or capacitive components, the internal diameter of the discrete capacitors matching that of the remaining openings and including therein contact termination structures, the discrete capacitors being electrically connected between one of the groups of interleaved electrodes in the block and respective contacts.

By combining a monolithic capacitor block with discrete capacitors, the discrete capacitors being fitted into openings in the block and electrically connected between the contacts and interleaved electrodes of the capacitor block, the claimed invention provides a monolithic capacitor array in which the range of possible ratios between individual capacitances for selected contacts can be increased significantly relative to conventional arrangements, and yet in which those contacts requiring capacitances within the range of a conventional monolithic filter block can be filtered without the need to add discrete capacitor structures for those contacts. In the illustrated embodiment of the invention, for example, a capacitance range of 50 pF to 50000 pF (1:1000) is achieved, and yet only 34 out of 106 filtered contacts are required to be provided with discrete capacitors. In this manner, the assembly of the invention increases the range of capacitances relative to conventional filter arrays while at the same time decreasing the number of discrete capacitors that must be provided, and therefore the cost of the assembly, relative to conventional discrete capacitor arrangements.

In addition, according to an especially advantageous implementation of the preferred embodiment of the invention, the interleaved electrodes to which the discoidal or tubular capacitors are electrically connected are the ground electrodes, and thus the filtered contacts are surrounded by a grounded conductor that forms a shield to prevent cross-talk with other contacts. As indicated above, it is in practice impossible to achieve such individual shielding in a conventional monolithic filter block arrangement having a high dielectric constant.

Finally, it will be appreciated by those skilled in the art that the capacitors arrays of the preferred embodiments of the invention may be used in any electrical connector that conventionally uses planar capacitor arrays, including D-sub and ARINC type connectors, and that the invention is not to be limited to any particular connector configuration.

DETAILED DESCRIPTION OF THE PREFERRED EMBODIMENTS

Figure 1:
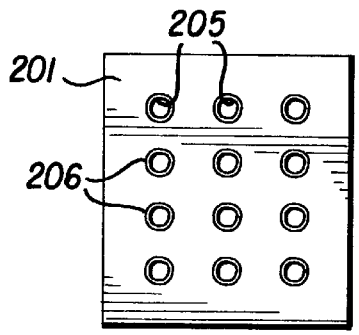
FIG. 1 is a plan view of a conventional planar capacitor array.
Figure 2:
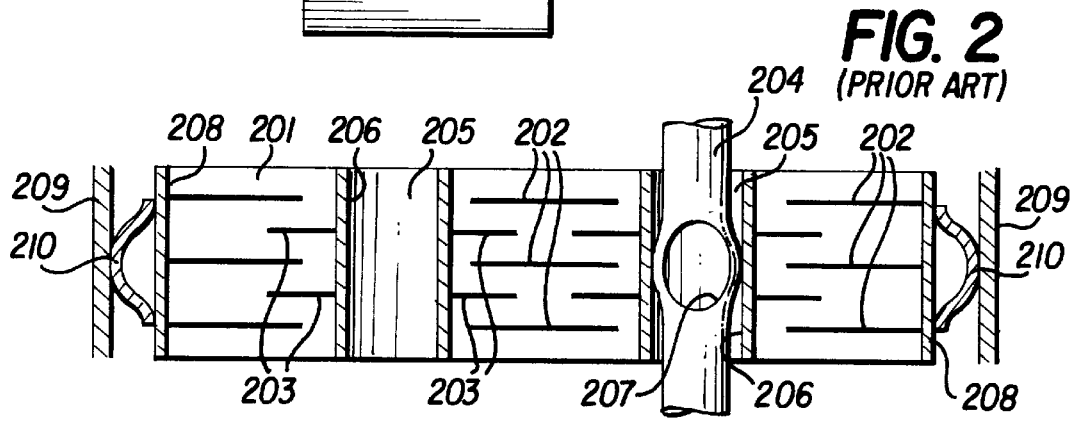
FIG. 2 is a cross-sectional side view of the conventional planar capacitor array illustrated in FIG. 1.
Figure 3:
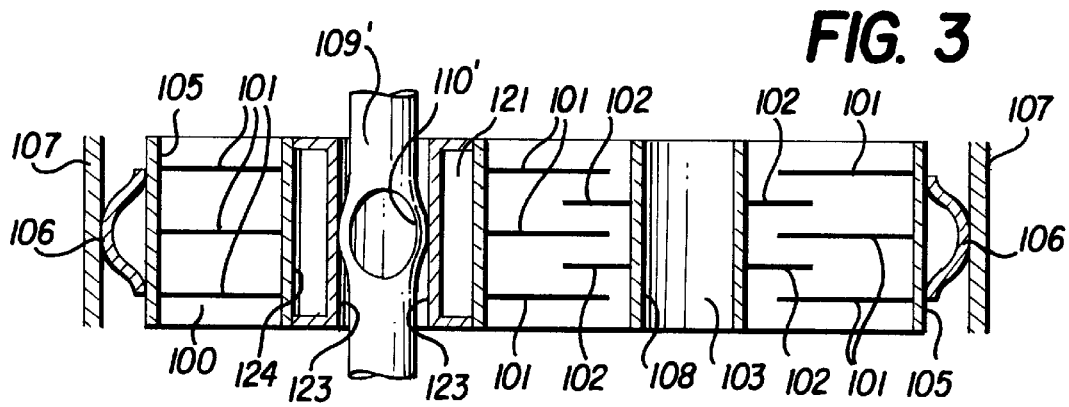
FIGS. 3 and 4 are cross-sectional side views of a planar capacitor array constructed in accordance with the principles of a preferred embodiment of the invention, respectively after and before insertion of a tubular capacitor into the array.
Figure 4:
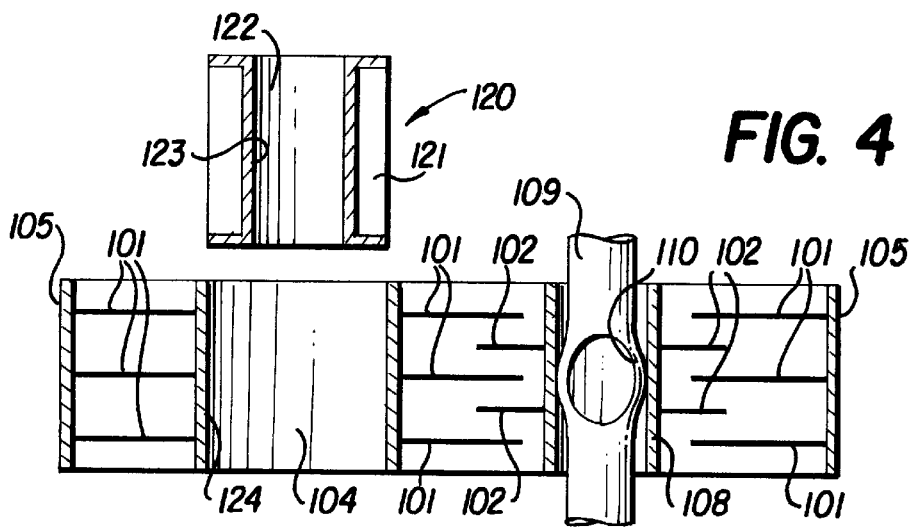

As illustrated in FIGS. 3 and 4, the planar capacitor array of the preferred embodiment of the invention includes a substrate 100 made of a dielectric material such as barium titanate. Substrate 100 contains a plurality of interleaved conductive plates 101,102 formed in a conventional manner by printing metal layers between layers of an unfired or green ceramic material, with openings in the plates being aligned to form contact openings 103 and 104.

Plates 101 form ground electrodes for the capacitor array. Each of plates 101 is connected to a metal strip, layer, or coating 105 on at least one and preferably all sides of the substrate 100 (or to multiple strips, layers, coatings or the like) to form terminals which can be electrical connected to ground by any convenient means. In the illustrated embodiment, plates 101 are connected to ground through layers 105, spring structures 106, and connector shell 107, although those skilled in the art will appreciate that numerous arrangements for connecting electrodes of a monolithic capacitor array to ground are known, and that any of them could be substituted for the illustrated grounding arrangement, which forms no part of the present invention except as noted below.

Plates 102, on the other hand, are connected to termination structures within contact pin openings 103 which, in conventional fashion, include a layer, coating, clip, or other termination structure 108 for electrically connecting plates 102 with a corresponding contact pin 109 schematically illustrated in FIG. 4 as including a resilient structure 110 for maintaining a low impedance electrical connection to the termination structure 108. Again, numerous variations of the illustrated live electrode termination structure are known and any of the known termination structures could be substituted depending on the type of connector and configuration of the contacts, the manner in which the live electrodes are terminated to the contact pins forming no part of the present invention except as noted below.

The above-described configuration of the capacitor array and electrodes is thus conventional. Examples of suitable monolithic capacitor structures are found, for example, in the above-cited U.S. Pat. Nos. 4,083,022 and 4,707,048, the disclosures of which are herein incorporated by reference, as well as in numerous other publications and patents. Unlike the prior monolithic capacitor structures, however, the monolithic capacitor array of the present invention is arranged to accommodate discrete tubular or discoidal capacitor structures 120 having at least a dielectric main body 121, a central opening 122, and a live electrode structure 123 within the central opening 122 for receiving another of the contacts 109.

Accommodation of discrete capacitor structures 120 is accomplished by providing enlarged through-holes or openings 104 provided with termination structures 124 in the same manner as openings 103, i.e., by adding a conductive layer, coating, sleeve, or other structure to the inner circumference of the openings, at least one of the sets of interleaved electrode plates 101,102 being exposed so as to electrically contact the corresponding termination structures. Following insertion of the discrete capacitor structures 120 into the openings 104, they may be secured by solder, epoxy, or any other known securing medium, or alternatively secured mechanically in such a way as to enable removal or replacement of individual capacitor structures. In addition, it is within the scope of the invention to insert the capacitor structures into the openings before firing of the substrate during initial manufacture of the array.

As illustrated, capacitor structures 120 do not have internal electrodes, but rather are in the form of blank ceramic tubes, since the termination structures 124 on the surface of openings 104 effectively serve as the second electrode of the capacitor structure, termination structures 124 being electrically connected to plates 101, and therefore to ground. However, those skilled in the art will appreciate that termination structures 124 may be either fully or partially terminated depending upon whether a blank ceramic tube or a ceramic tube containing buried electrodes is required, and that the termination structures may either be in the planar hole, on the outside of the discrete capacitor, or both.

Connection of the termination structures 124 directly to the ground electrodes has the advantage that termination structures 124 electrically isolate the corresponding contact pins 109', which otherwise is identical to contact pins 109, thereby shielding the contact pins from cross-talk. On the other hand, connection of termination structures 124 to non-grounded electrodes effectively series connects the discrete capacitors structures to the monolithic capacitor block, greatly extending the range of capacitances that can be provided.

Those skilled in the art will note that the illustrated capacitor block utilizes both conventional and enlarged openings 103,104. The inclusion of conventional openings 103 enables contact pins 109 to be filtered without the need for additional discrete capacitor structures, the discrete capacitor structures being used only for those contacts requiring capacitances outside the range that can be conveniently achieved using a monolithic filter block by itself. On the other hand, it is within the scope of the invention to provide a discrete capacitor structure for each contact opening in the array, eliminating conventional openings 103.

The capacitor array of the illustrated embodiment is completed and may be mounted in an electrical connector in a conventional manner, for example by using springs 106 as indicated above. The capacitor array may be completed by adding conformal coatings as appropriate, and the structure for mounting the array in a connector may include, in addition to or in place of springs 106, any type of supporting insert, gasket, suspension, or the like, the shape of the substrate being a function of the type of connector in which the array is to be inserted, as is the number and size of openings, and the arrangement of ground and live or active electrodes. It is possible to vary the sizes of the openings within an array so that, for example, openings 122 in the capacitor structures are smaller or larger than openings 103, necessitating or accommodating the use of different sizes of contacts.

The materials of the discrete capacitor structures 120 and of substrate I are preferably chosen to have similar thermal expansion coefficients in order to minimize mechanical stress associated with the thermal cycling of ceramic components bonded to dissimilar ground plates, although it is also possible to include connecting or supporting structures that compensate for differences in thermal characteristics.

Figures 5, 6:
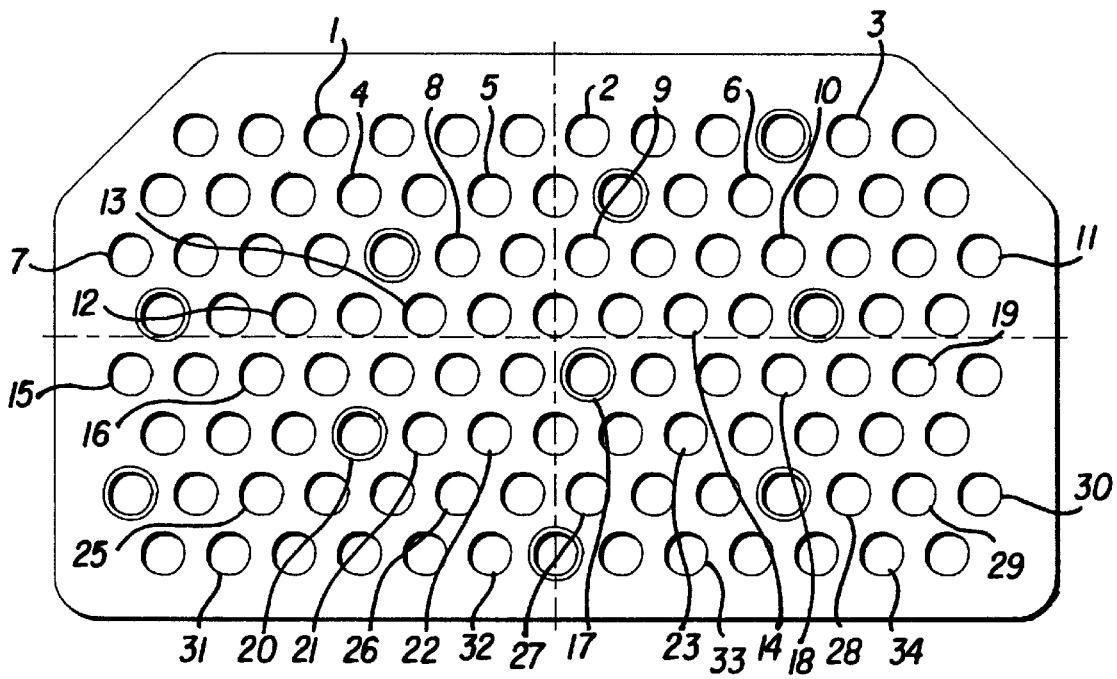
FIG. 5 is a plan view of a specific example of a planar filter array utilizing the principles of the preferred embodiment illustrated in FIGS. 3–4.
FIG. 6 is a table showing respective capacitances of various contact pins in the array illustrated in FIG. 5.

An example of a capacitor array configuration utilizing the above principles is illustrated in FIGS. 5 and 6. Each of the numbered openings 1–34 shown in FIG. 5 has a capacitance listed in the table of FIG. 6, with the variations in capacitances being attributable either to the use of discrete capacitor structures (elements 2, 3, 5, 6, 8, 9, 10, 14, 16, 17, 18, 19, 20, 23, 24, 25, 26, 27, 28, and 32) or to the interleaved electrode structure (elements 1, 4, 7, 11, 12, 13, 15, 21, 22, 29, 30, 31, 33, and 34). This array was made of a barium titanate ceramic material using the conventional procedure of screen printing, but with enlarged openings 2, 3, 5, 6, 8, 9, 10, 14, 16, 17, 18, 19, 20, 23, 24, 25, 26, 27, 28, and 32 into which are fitted tubular capacitors in the manner illustrated in FIGS. 3 and 4.

Having thus described preferred embodiments of the invention with sufficient particularity to enable those skilled in the art to easily make and use the invention, and having described several possible variations and modifications of the preferred embodiment, it should nevertheless be appreciated that still further variations and modifications of the invention are possible, and that all such variations and modifications should be considered to be within the scope of the invention. Accordingly, the scope of the invention should not be limited by the above description, but rather should be interpreted solely in accordance with the appended claims.

I claim:

1. A monolithic capacitive planar filter assembly, comprising:

a dielectric body within which are interleaved first and second planar electrodes to form a capacitive structure, said body having a plurality of holes therethrough, wherein at least one of said holes includes a discrete capacitor structure having a central opening and a conductive termination structure within said opening for receiving a contact pin inserted into said opening, said discrete capacitor structure being electrically connected between said contact pin and one of said first and second planar electrodes.

2. An assembly as claimed in claim 1, wherein at least a second of said holes has on its surface a conductive termination structure electrically connected to another of said first and second planar electrodes and arranged to be electrically connected to a contact pin inserted into said second one of said holes.

3. An assembly as claimed in claim 2, further comprising a discrete capacitor termination structure within the first of said holes, said discrete capacitor termination structure being electrically connected to said one of said first and second planar electrodes.

4. An assembly as claimed in claim 3, wherein said discrete capacitor structure is connected to said first planar electrode, said conductive termination structure is connected to said second planar electrode, said first planar electrode is a ground electrode, and said second planar electrode is an active electrode.

5. An assembly as claimed in claim 4, wherein said discrete capacitor structure surrounds a contact pin inserted in said first one of said holes, thereby shielding said contact pin from cross-talk.

6. An assembly as claimed in claim 1, wherein said one of said planar electrodes to which the discrete capacitor structure is electrically connected is a ground electrode.

7. An assembly as claimed in claim 1, further comprising a discrete capacitor termination structure within the first of said holes, said discrete capacitor termination structure being electrically connected to said one of said first and second planar electrodes.

8. An assembly as claimed in claim 1, wherein said discrete capacitor structure is a tubular capacitor.

9. An assembly as claimed in claim 1, wherein said discrete capacitor structure is a dielectric body, and wherein a capacitor is formed between the conductive termination structure in the central opening and a termination structure on a surface of said first one of said holes.

10. A connector, comprising:

a shell; and a capacitor array mounted within the shell, the capacitor array comprising:

a dielectric body within which are interleaved first and second planar electrodes to form a capacitive structure, said body having a plurality of holes therethrough, wherein at least one of said holes includes a discrete capacitor structure having a central opening and a conductive termination structure within said opening for receiving a contact pin inserted into said opening, said discrete capacitor structure being electrically connected between said contact pin and one of said first and second planar electrodes.

11. A connector as claimed in claim 10, wherein at least a second of said holes has on its surface a conductive termination structure electrically connected to another of said first and second planar electrodes and arranged to be electrically connected to a contact pin inserted into said second one of said holes.

12. A connector as claimed in claim 11, further comprising a discrete capacitor termination structure within the first of said holes, said discrete capacitor termination structure being electrically connected to said one of said first and second planar electrodes.

13. A connector as claimed in claim 12, wherein said discrete capacitor structure is connected to said first planar electrode, said conductive termination structure is connected to said second planar electrode, said first planar electrode is a ground electrode, and said second planar electrode is an active electrode.

14. A connector as claimed in claim 13, wherein said discrete capacitor structure surrounds a contact pin inserted in said first one of said holes, thereby shielding said contact pin from cross-talk.

15. A connector as claimed in claim 10, wherein said one of said planar electrodes to which the discrete capacitor structure is electrically connected is a ground electrode.

16. A connector as claimed in claim 10, further comprising a discrete capacitor termination structure within the first of said holes, said discrete capacitor termination structure being electrically connected to said one of said first and second planar electrodes.

17. A connector as claimed in claim 10, wherein said discrete capacitor structure is a tubular capacitor.

18. A connector as claimed in claim 10, wherein said discrete capacitor structure is a dielectric body, and wherein a capacitor is formed between the conductive termination structure in the central opening and a termination structure on a surface of said first one of said holes.

* * * * *